United States Patent [19]

Soula et al.

[11] Patent Number: 5,667,703
[45] Date of Patent: Sep. 16, 1997

[54] PROCESS AND GASEOUS MIXTURE FOR ARC WELDING OF ALUMINIUM COMPONENTS

[75] Inventors: Richard Soula, Vertou; Didier Marchand, Saint-Germain-en-Laye; Henri Diot, Saint-Ouen-L'Aumone, all of France

[73] Assignee: L'Air Liquide, Societe Anonyme pour L'Etude et L'Exploitation des Procedes Georges Claude, Paris Cedex, France

[21] Appl. No.: 707,615

[22] Filed: Sep. 5, 1996

[30] Foreign Application Priority Data

Sep. 8, 1995 [FR] France .................... 95 10518

[51] Int. Cl.[6] ................................ B23K 9/167
[52] U.S. Cl. ...................... 219/75; 219/137 WM
[58] Field of Search ...................... 219/74, 75 WM

[56] References Cited

U.S. PATENT DOCUMENTS

| 5,210,388 | 5/1993 | Farwer | 219/74 |
|---|---|---|---|
| 5,210,389 | 5/1993 | Farwer | 219/74 |

FOREIGN PATENT DOCUMENTS

| 0 640 431 | 3/1995 | European Pat. Off. . |
| 1230274 | 9/1960 | France . |
| 4 028 074 | 1/1992 | Germany . |

OTHER PUBLICATIONS

M.M. Nerodenko et al., "Niobium Alloys Welded in Helium with Nitrogen Added", *Automatic Welding*, vol. 31, No. 10, Oct. 1978, pp. 3–6.

Taiichiro Mantani et al., "Addition of nitrogen to the shield gas (argon– helium) in MIG [metal inert gas]welding of aluminum alloys", *Chemical Abstracts*, vol. 72, No. 12, Mar. 1970, Abstract No. 58440.

*Primary Examiner*—Clifford C. Shaw
*Attorney, Agent, or Firm*—Young & Thompson

[57] ABSTRACT

The arc welding, with a refractory electrode, using alternating current, is performed with a gaseous protective mixture including at the location of the weld, at least 50%, typically between 60 and 80% of helium and at least 300 vpm, typically between 400 and 800 vpm, of nitrogen, the remainder being argon.

Application to manual or automatic welding of aluminium components.

5 Claims, No Drawings

PROCESS AND GASEOUS MIXTURE FOR ARC WELDING OF ALUMINIUM COMPONENTS

The present invention relates to arc welding with a refractory electrode (TIG welding, for "Tungsten Inert Gas") of components made of aluminium or of aluminium alloys and more particularly to a gaseous protective mixture for welding of this type.

It is known that, because of the tendency for layers of alumina $Al_2O_3$ to form on the surface of articles made of aluminium, these layers, which are insulating, interfere with the TIG welding of such components. It is known, furthermore, that, to destroy the alumina layer, an alternating current supply to the arc can be employed. In so-called reverse polarity the flow of electrons escaping from the aluminium component cracks and disperses the alumina layer. During the following half-cycle the flow of electrons emitted by the electrode and bombarding the aluminium component provides the weld penetration. The electrode is thus alternately hot, when it is receptive, then cold when it is emitting (direct polarity), which explains why the switching from the reverse polarity to the direct polarity is easy, whereas the reversal from direct polarity to reverse polarity is more tricky, the pool being less emissive than the tungsten electrode. This phenomenon is aggravated by the presence of helium in the welding gas. In contrast to argon, helium does not, in fact, promote gas ionization, and this can result in the appearance of brief breaks in the arc or of instability, this being more pronounced when the percentage of helium is high. In manual welding the welder is then obliged to compensate by remaining momentarily on the spot, the average rate of welding being considerably reduced thereby. In automatic welding the instabilities may cause irregularities in the penetration, resulting in rejection or reworking of welded components. It is understood that, while the addition of helium to argon appreciably improves the performance of TIG welding of aluminium components, essentially as regards the increase in the depths of penetration and better compactness, in practice the helium contents in the mixtures for TIG welding of aluminium components do not exceed a few tens percent, a content reaching 50% being exceptional, as is recalled by the work "Welding Aluminum: Theory and Practice" published by the Aluminum Association, second edition, June 1991, page 6.3.

Regardless of whether MIG or TIG welding of aluminium components is involved, document U.S. Pat. No. 5,210,389 has proposed adding very small quantities of nitrogen to the inert gas (argon in the comparative examples which are given), these not exceeding 250 ppm, to avoid the phenomena of arc breaking, which would appear even in the absence of helium.

The objective of the present invention is to propose a new gaseous mixture for alternating-current TIG welding of components made of aluminium or of aluminium alloys making it possible to exploit fully the beneficial effects of a high helium content where the welding performance and the bead compactness are concerned, without markedly affecting the arc stability or the rate of welding.

To do this, according to a characteristic of the invention, a gaseous mixture is employed at the location of the weld, including at least 50% of helium, typically at least 60%, preferably between 70 and 80% of helium and between 300 and 1000 vpm, typically between 400 and 800 vpm, of nitrogen, the remainder being argon.

The Applicant Company has found, in fact, that, in contrast to the teaching of the abovementioned document U.S. Pat. No. 5,210,389, which does not describe precise gaseous mixtures containing helium, the stabilizing role of the nitrogen is actually advantageous only in the case of high helium contents, in the case of which the risks of arc breaks are significant.

Thus, with a mixture including:

80% He 600 ppm $N_2$ remainder argon, in alternating-current TIG, joints are produced over a depth of 5 mm of components made of alloys of aluminium and of magnesium with a current of only 95 amperes. The compactness, the mechanical characteristics and the appearance of the bead are good. There is no deterioration of the electrode.

We claim:

1. Process for alternating-current arc welding with a refractory electrode of components made of aluminium or of aluminium alloys, employing, at the location of the weld, a gaseous protective mixture including at least 50% of helium and at least 300 vpm of nitrogen, the remainder being argon.

2. Process according to claim 1, characterized in that a gaseous protective mixture is employed containing at least 60% of helium and less than 1000 vpm of nitrogen.

3. Process according to claim 2, characterized in that a gaseous protective mixture is employed containing from 400 to 800 vpm of nitrogen.

4. Gaseous mixture for arc welding with a refractory electrode and under alternating current of components containing aluminium, characterized in that it includes approximately between 60% and 80% of helium and between 300 and 1000 vpm of nitrogen, the remainder being argon.

5. Gaseous mixture according to claim 4, characterized in that the nitrogen content is between 400 and 800 vpm.

* * * * *